(12) United States Patent
Armangau et al.

(10) Patent No.: US 9,251,159 B1
(45) Date of Patent: *Feb. 2, 2016

(54) PARTIAL BLOCK ALLOCATION FOR FILE SYSTEM BLOCK COMPRESSION USING VIRTUAL BLOCK METADATA

(71) Applicant: EMC Corporation, Hopkinton, MA (US)

(72) Inventors: Philippe Armangau, Acton, MA (US); Jean-Pierre Bono, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,440

(22) Filed: Nov. 25, 2013

Related U.S. Application Data

(63) Continuation of application No. 13/434,448, filed on Mar. 29, 2012, now Pat. No. 8,615,500.

(51) Int. Cl.
*G06F 17/30* (2006.01)
(52) U.S. Cl.
CPC .... *G06F 17/30153* (2013.01); *G06F 17/30156* (2013.01)
(58) Field of Classification Search
CPC .......... G06F 11/1471; G06F 17/30067; G06F 17/00; G06F 17/30; G06F 12/00; G06F 12/02; G06F 12/08; G06F 2212/214; G06F 2212/401; G06F 12/0866; G06F 12/0897; G06F 2212/311; G06F 2212/312; G06F 3/0608; G06F 17/30159; G06F 17/30289; G06F 17/30156; G06F 3/0613; H04L 69/04; H04L 41/00
USPC ......... 707/690, 693, 695, 697, 700, 703, 704, 707/758, 654, 696, 741, 692, E17.005, 707/E17.01, E17.055; 711/165, 209, 114, 711/200, 118, 154, 171, 156, 162, 170, 173, 711/202, E12.001, E12.002, E12.103; 709/223, 217, 225, 208; 714/6, 7
See application file for complete search history.

(56) References Cited

U.S. PATENT DOCUMENTS 4,464,650 A    8/1984    Eastman et al.
5,373,290 A    12/1994    Lempel et al.

(Continued)

OTHER PUBLICATIONS

Makatos, T. et al.—"ZBD: Using Transparent Compression at the Block Level to Increase Storage Space Efficiency"—Published in: Storage Network Architecture and Parallel I/Os (SNAPI), 2010 International Workshop on—Date of Conference: May 3-3, 2010—pp. 61-70.*

(Continued)

*Primary Examiner* — Anh Ly
(74) *Attorney, Agent, or Firm* — Richard Auchterlonie; Novak Druce Connolly Bove + Quigg LLP

(57) ABSTRACT

A file server has a data compression facility and also a snapshot copy facility or a data de-duplication facility that shares data blocks among files. Compression of the file data on a file system block basis leads to a problem of partially used file system data blocks when the data blocks are shared among files. This problem is solved by partial block allocation so that file system data blocks are shared among files that do not share identical data. Block pointers in the file mapping metadata point to virtual blocks representing the compressed data blocks, and associated virtual block metadata identifies portions of file system data blocks that store the compressed data. For example, a portion of a file system data block is identified by a sector bitmap, and the virtual block metadata also includes a reference count to indicate sharing of a compressed data block among files.

22 Claims, 6 Drawing Sheets

(56) References Cited

U.S. PATENT DOCUMENTS

| | | | |
|---|---|---|---|
| 5,463,772 A * | 10/1995 | Thompson et al. | 707/693 |
| 5,893,140 A | 4/1999 | Vahalia et al. | |
| 6,922,759 B1 | 7/2005 | Garritsen | |
| 7,162,643 B1 * | 1/2007 | Sankaran | H04L 63/0428 |
| | | | 370/342 |
| 7,496,586 B1 * | 2/2009 | Bonwick et al. | 707/693 |
| 7,555,504 B2 | 6/2009 | Bixby et al. | |
| 7,577,817 B2 * | 8/2009 | Karpoff et al. | 711/206 |
| 7,631,155 B1 | 12/2009 | Bono et al. | |
| 7,719,443 B1 * | 5/2010 | Natanzon | G06F 11/1471 |
| | | | 341/50 |
| 7,747,584 B1 * | 6/2010 | Jernigan, IV | 707/692 |
| 7,769,967 B2 * | 8/2010 | Zhu | G06F 3/0608 |
| | | | 711/100 |
| 7,822,728 B1 | 10/2010 | Chandler et al. | |
| 7,873,619 B1 * | 1/2011 | Faibish et al. | 707/705 |
| 7,913,114 B2 | 3/2011 | Leppard | |
| 7,961,960 B2 * | 6/2011 | Bashyam et al. | 382/232 |
| 8,019,733 B2 | 9/2011 | Adkins et al. | |
| 8,032,498 B1 | 10/2011 | Armangau et al. | |
| 8,051,044 B1 * | 11/2011 | Dyatlov et al. | 707/646 |
| 8,115,660 B2 | 2/2012 | Kaufman et al. | |
| 8,190,850 B1 * | 5/2012 | Davenport et al. | 711/202 |
| 8,578,128 B1 * | 11/2013 | Davenport et al. | 711/202 |
| 8,615,500 B1 | 12/2013 | Armangau et al. | |
| 8,745,338 B1 * | 6/2014 | Yadav et al. | 711/154 |
| 2002/0040405 A1 * | 4/2002 | Gold | G06F 17/30067 |
| | | | 709/231 |
| 2004/0098663 A1 | 5/2004 | Ray et al. | |
| 2006/0184505 A1 * | 8/2006 | Kedem et al. | 707/1 |
| 2008/0152235 A1 * | 6/2008 | Bashyam et al. | 382/224 |
| 2008/0154928 A1 * | 6/2008 | Bashyam | H03M 7/30 |
| | | | 707/E17.002 |
| 2009/0019345 A1 | 1/2009 | Kaufman et al. | |
| 2009/0049068 A1 | 2/2009 | Adkins et al. | |
| 2009/0063795 A1 * | 3/2009 | Yueh | 711/162 |
| 2009/0154545 A1 * | 6/2009 | Fallon et al. | 375/240 |
| 2009/0254532 A1 | 10/2009 | Yang et al. | |
| 2009/0319534 A1 | 12/2009 | Gokhale | |
| 2010/0049735 A1 | 2/2010 | Hsu | |
| 2010/0094813 A1 * | 4/2010 | Brueggemann et al. | 707/692 |
| 2010/0153617 A1 | 6/2010 | Miroshnichenko et al. | |
| 2010/0228800 A1 * | 9/2010 | Aston et al. | 707/822 |
| 2010/0274772 A1 * | 10/2010 | Samuels | G06F 17/30233 |
| | | | 707/693 |
| 2010/0293142 A1 * | 11/2010 | Ackerman et al. | 707/640 |
| 2010/0332454 A1 * | 12/2010 | Prahlad et al. | 707/654 |
| 2010/0332818 A1 * | 12/2010 | Prahlad et al. | 713/150 |
| 2010/0333116 A1 * | 12/2010 | Prahlad et al. | 719/328 |
| 2011/0099155 A1 | 4/2011 | Shau et al. | |
| 2011/0113194 A1 * | 5/2011 | Terry et al. | 711/114 |
| 2011/0173209 A1 * | 7/2011 | Fortier | 707/747 |
| 2011/0218976 A1 * | 9/2011 | Amit et al. | 707/693 |
| 2011/0246432 A1 | 10/2011 | Yang et al. | |
| 2011/0307447 A1 * | 12/2011 | Sabaa et al. | 707/637 |
| 2011/0307659 A1 * | 12/2011 | Hans et al. | 711/114 |
| 2012/0101991 A1 * | 4/2012 | Srivas et al. | 707/623 |
| 2012/0158647 A1 * | 6/2012 | Yadappanavar | G06F 17/30153 |
| | | | 707/609 |
| 2012/0265933 A1 * | 10/2012 | Gupta | G06F 3/0689 |
| | | | 711/114 |
| 2012/0284242 A1 * | 11/2012 | Amit et al. | 707/693 |
| 2013/0073821 A1 * | 3/2013 | Flynn et al. | 711/162 |
| 2013/0097210 A1 * | 4/2013 | Amit et al. | 707/813 |
| 2013/0226883 A1 * | 8/2013 | Klose | 707/692 |
| 2013/0238572 A1 * | 9/2013 | Prahlad et al. | 707/692 |
| 2013/0318051 A1 * | 11/2013 | Kumar et al. | 707/692 |

OTHER PUBLICATIONS

Xiaoming Liu et al.—"Technical Report Interchange through Synchronized OAI Caches"—Research and Advanced Technology for Digital Libraries Lecture Notes in Computer Science vol. 2458, 2002, Date: Sep. 13, 2002 pp. 176-189.*

Vahalia, Uresh, Unix Internals: The New Frontiers, 1996, pp. 187-290, 338-371, Prentice-Hall, Inc. Upper Saddle River, New Jersey.

Ziv, Jacob, and Lempel, Abraham, "A Universal Algorithm for Sequential Data Compression," IEEE Transactions on Information Theory, vol. 23 No. 3, May 1977, pp. 337-343, IEEE, New York, NY.

FIPS Publication 180-2 Secure Hash Standard, Aug. 1, 2002, 83 pages, National Institute of Standards and Technology, Gaithersburg, MD.

Biliris, Alexandros, "An Efficient Database Storage Structure for Large Dynamic Objects," Proceedings, IEEE Data Engineering Conference, Phoenix, Arizona, Feb. 1992, pp. 301-308, IEEE, New York, NY.

Esterhuyse, Eben, "On Providing and Efficient and Reliable Virtual Block Storage Service," Master'Thesis, Nov. 2000, 74 pages, Stellenbosch University, Stellenbosch, South Africa.

Aggarwal, Gitika, "Metadata Services for the Parallax Storage System," Master's Thesis, Jul. 2008, 58 pages, The University of British Columbia, Vancouver, Canada.

\* cited by examiner

PARTIAL BLOCK ALLOCATION FOR FILE SYSTEM BLOCK COMPRESSION USING VIRTUAL BLOCK METADATA

RELATED APPLICATIONS

This application is a continuation of Philippe Armangau and Jean-Pierre Bono, U.S. application Ser. No. 13/434,448, now U.S. Pat. No. 8,615,500 B1, filed Mar. 29, 2012, entitled "Partial Block Allocation for File System Block Compression Using Virtual Block Metadata," incorporated herein by reference.

FIELD OF THE INVENTION

The present invention relates to a file server that shares file system data blocks among files in a file system and also performs compression of file data blocks.

BACKGROUND OF THE INVENTION

In recent years there has been a problem of an increasing number of stored electronic documents that have identical or virtually identical content. To deal with this problem, data de-duplication techniques have been developed for reducing the data storage requirements of virtually identical files. These data de-duplication techniques determine file segments that are identical among virtually identical files, so that the data content of each shared file segment need be stored only once for the virtually identical files. The shared data content is placed in a common storage area, and each identical segment is removed from each of the virtually identical files and replaced with a corresponding link to the shared data content.

For example, a data de-duplication application identifies redundant data in pooled storage capacity and replaces it with one or more pointers pointing to a single instance of the data. The de-duplication application can operate on fixed or variable-size blocks of data and can de-duplicate data either post-process or on-line. See Yueh U.S. Pat. App. Pub. 2009/0063795 A1 published Mar. 5, 2009, incorporated by reference.

In recent years there has also been increasing use of data compression techniques to store data more efficiently. Data compression techniques have been well known for reducing redundancy in data for more efficient archival storage and for more efficient transmission over a limited-bandwidth channel. More recently data compression techniques have been applied generally to the on-line storage of infrequently accessed files. A wide variety of data compression techniques are available depending on the type of data to be stored. There are also a number of well-known loss-less data compression techniques that have universal applicability to all kinds of data.

A popular loss-less data compression technique is the Lempel-Ziv procedure, which achieves data compression by replacing repeated occurrences of data with references to a dictionary that is built based on the input data. The basic procedure was published in Jacob Ziv and Abraham Lempel; A Universal Algorithm for Sequential Data Compression, IEEE Transactions on Information Theory, 23(3), pp. 337-343, May 1977. Variations of the Lempel-Ziv procedure are further described in Eastman et al. U.S. Pat. No. 4,464,650 issued Aug. 7, 1984, incorporated herein by reference; Lempel et al. U.S. Pat. No. 5,373,290 issued Dec. 13, 1994 incorporated herein by reference; and Natanzon U.S. Pat. No. 7,719,443 issued May 18, 2010 incorporated herein by reference.

SUMMARY OF THE INVENTION

The inventors have recognized a problem of partially used file system data blocks in a data storage system that shares data blocks among files and also compresses the file data blocks. In this particular situation there is a need for an efficient way of identifying file system data blocks that are partially used so that these file system data blocks can become more fully used by sharing these file system data blocks among files that do not share identical data.

In accordance with one aspect, the invention provides a method of operating a file server. The file server has data storage storing a file system, a data processor coupled to the data storage for access to files in the file system, and non-transitory computer readable storage medium coupled to the data processor and storing computer instructions. The computer instructions, when executed by the data processor, perform a method of writing a new block of data to a first file in the file system by the steps of: (a) compressing the new block of data to produce compressed data for the first file; (b) finding a file system data block containing compressed data of a second file in the file system and having sufficient free space for storage of the compressed data for the first file; (c) writing the compressed data for the first file to the free space of the file system data block; and (d) linking the compressed data for the first file to the first file.

In accordance with another aspect, the invention provides a file server. The file server includes data storage storing a file system, a data processor coupled to the data storage for access to files in the file system, and non-transitory computer readable storage medium coupled to the data processor and storing computer instructions. The computer instructions, when executed by the data processor, perform a method of writing a new block of data to a first file in the file system by the steps of: (a) compressing the new block of data to produce compressed data for the first file; (b) finding a file system data block containing compressed data of a second file in the file system and having sufficient free space for storage of the compressed data for the first file; and (c) writing the compressed data for the first file to the free space of the file system data block; (d) linking the compressed data for the first file to the first file.

In accordance with a final aspect, the invention provides a computer program product including non-transitory computer readable storage medium containing computer instructions. The computer instructions, when executed by a data processor of a file server, perform a method of writing a new block of data to a first file in a file system by the steps of: (a) compressing the new block of data to produce compressed data for the first file; (b) finding a file system data block containing compressed data of a second file in the file system and having sufficient free space for storage of the compressed data for the first file; (c) writing the compressed data for the first file to the free space of the file system data block; and (d) linking the compressed data for the first file to the first file.

BRIEF DESCRIPTION OF THE DRAWINGS

Additional features and advantages of the invention will be described below with reference to the drawings, in which.

Figure 1:
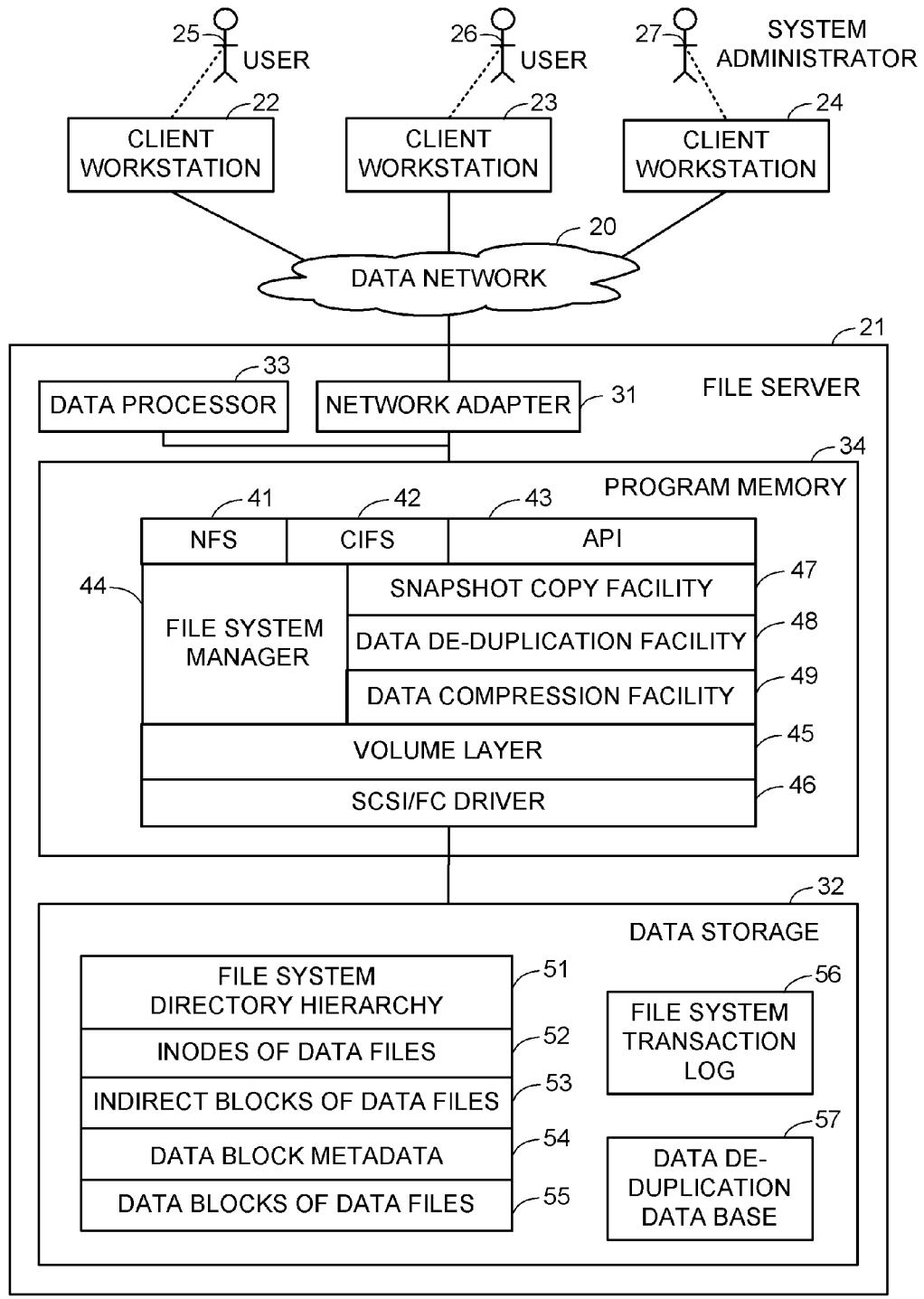
FIG. 1 is block diagram of a data processing system incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a data network 20 linking a network file server 21 to client workstations 22, 23, 24 operated by human users 25, 26, 27. The data network 20, for example, is an Ethernet or Internet Protocol (IP) data network. The user 27 is a system administrator responsible for configuration and maintenance of the data processing system.

The file server 21 includes a network adapter 31 linking the file server to the data network 20. The file server 21 also includes data storage 32 such as one or more disk drives. The file server 21 further includes a data processor 33 coupled to the network adapter 31 and programmed for responding to client requests for access to files in the data storage 32.

The data processor 33 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM).

The program memory 34 contains a number of program layers, including a Network File System (NFS) module 41, a Common Internet File System (CIFS) module 42, and an application program interface (API) module 43. The NFS module 41 recognizes file access commands received by the network adapter 31 from the client workstations 22, 23, 24 in accordance with the NFS protocol. The CIFS module 42 recognizes file access commands received by the network adapter 31 from the client workstations 22, 23, 24 in accordance with the CIFS protocol. For example, network clients such as UNIX (Trademark) workstations may use the Network File System (NFS) protocol to access files in the data storage 32 of the file server 21, and network clients such as Microsoft Windows (Trademark) workstations may use the Common Internet File System (CIFS) protocol to access files in the data storage 32 of the file server 21.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The program memory 34 further contains a file system manager 44 for managing a hierarchical file system in the data storage 32. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 44 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The program memory 34 further contains a volume layer 45 for organizing the data storage 32 into logical volumes of data blocks, and a Small Computer System Interface (SCSI) or Fibre Channel (FC) driver 46 for linking the volume layer 45 to the data storage 32.

The program memory 34 further contains a file system based snapshot copy facility 47. The snapshot copy facility 47 permits the sharing of file system blocks between a production file and snapshot copies of the production file. The snapshot copy facility 47 is similar to the snapshot copy facility described in Bixby et al. U.S. Pat. No. 7,555,504 issued Jun. 30, 2009, incorporated herein by reference, except that the snapshot copy facility 47 uses delegated reference counts instead of an ownership flag for maintaining block ownership information of the production files and snapshot copies, as described in Armangau et al. U.S. Pat. No. 8,032,498 issued Oct. 4, 2011, incorporated herein by reference.

The data processor 33 is also programmed with a file system based data de-duplication facility 48. The data de-duplication facility 48 permits a shared file system data block to be linked to more than one inode or indirect block of the same file or otherwise unrelated files. The data de-duplication facility 48 eliminates duplicate data blocks when a new file is migrated to the file server or when new data is written to an old file in the file server. If a block of a new file or a block of new data is found to contain the same data as a pre-existing data block in the data storage 32, then the block of the new file or the block of new data is replaced with the pre-existing data block by sharing the pre-existing data block with the new file or the old file.

As shown in the data storage 32 in FIG. 1, the file system is organized as a hierarchy. At the top of the hierarchy is a hierarchy of the directories 51 in the file system. Inodes of data files 52 depend from the file system directory hierarchy 51. Indirect blocks of data files 53 depend from the inodes of the data files. Data block metadata 54 and data blocks of data files 55 depend from the inodes of data files 52 and from the indirect blocks of data files 53.

The data storage 32 also stores a file system transaction log 56. For recovery of the file system upon re-boot of the file server, changes to the file system metadata in the data storage 32 are first written to the file system transaction log 56 before the changes are written to the file system in the data storage. Upon re-boot, the file system transaction log is inspected to find the last transaction recorded in the log, and then this last transaction is re-written to the file system in the data storage 32 to ensure that this last transaction has been completely written into the file system in the data storage.

The data storage 32 also stores a data de-duplication database 57 containing the logical block addresses and corresponding SHA-2 hash values for the data blocks in the single instance store. For example, the SHA-2 hash values are computed using the SHA-256 algorithm described in FIPS Publication 180-2 Secure Hash Standard, Aug. 1, 2002, 83 pages, National Institute of Standards and Technology, Gaithersburg, Md.

In order to determine whether or not the content of a new data block is already in the single instance store, the SHA-2 hash value is computed of the content of the new data block, and then the data de-duplication database 57 is searched for a data block having the same SHA-2 hash value. The content of the new data block is then compared to the content of any data blocks in the data de-duplication database 57 having the same SHA-2 value. If a match of the content is found, then the pointer to the new data block is replaced with a pointer to the matching block found in the data de-duplication database 57. Otherwise, the new data block is added to the data de-duplication database 57.

The file server 21 also has a data compression facility 49 that may compress individual file system blocks of data using a general-purpose loss-less compression technique such as the Lempel-Ziv procedure. It is desired to use both block-level data de-duplication and block-level data compression to obtain a degree of data reduction greater than that provided by each of these techniques alone.

It is possible in many cases for the data compression technique to reduce the size of a data block by more than one half so that it is possible to combine block-level data de-duplication and block-level data compression to obtain a degree of data compression greater than that provided by each of these techniques. In this case the compressed data from one data block is stored together with compress data from another data block in the same file system data block so that free space from the block-level data compression is not wasted. In other words, what is needed is a way of sharing a file system data block between two files when the data block does not contain data that is shared between the two files. In this case the data block is shared between the two files because each of the two files uses a different part of the data block to store different compressed data. For example, a first part of the data block is allocated to a first file, and a second part of the data block is allocated to a second file, so that no part of the data block is shared between the first file and the second file.

One way of allocating parts of a file system data block to different files is to allocate different sectors of the file system data block to different files. For example, a sector is a 512 byte block of data having a sector-aligned logical address. The byte address of a sector-aligned logical address has nine least significant bits that are all zero. Such a sector is a conventional unit of granularity for an atomic write operation to storage. The file system data block includes multiple sectors, such as eight sectors for a conventional file system data block size of four kilobytes, or sixteen sectors for a conventional file system data block size of eight kilobytes.

Figure 2:
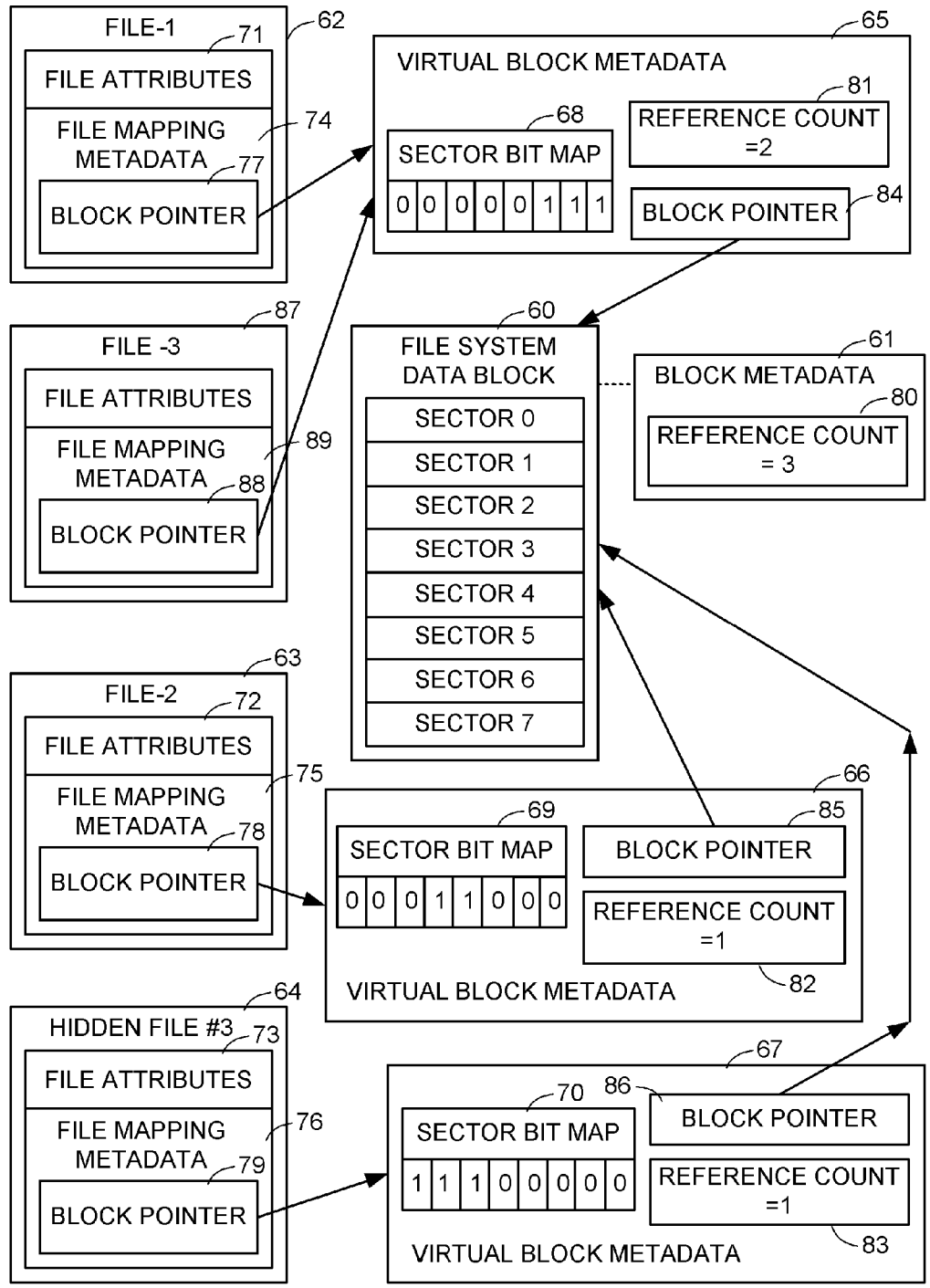
FIG. 2 is a block diagram showing the sharing of a file system data block among files that do not share data stored in the file system data block.

For example, FIG. 2 shows a way of sharing a file system data block 60 among three files 62, 63, 64 so that the first three sectors of the file system data block 60 are allocated to a first file 62, the second two sectors of the file system data block 60 are allocated to a second file 63, and the last three sectors of the file system data block 60 are allocated to a third file 64. Each file 62, 63, 64 sharing the file system data block 60 has a respective block of virtual block metadata (VBM) 65, 66, 67 having a respective sector bit map 68, 69, 70 indicating the particular sectors of the file system data block 60 that are allocated to the respective file. For example, in FIG. 2, the sector bit map 68 indicates that the compressed data block for the first file 62 is stored in sector 0, sector 1, and sector 2 of the file system data block 60, and the sector bit map 69 indicates that the compressed data block for the second file 63 is stored in sector 3 and sector 4 of the file system data block 60. Therefore each block 65, 66, 67 of virtual block metadata represents a block of data in the respective file 71, 72, or a set of free sectors in a hidden file 64.

In a similar fashion, the file system data block 60 has associated block metadata 61 about the file system data block. For example, the block metadata 61 associated with the file system data block 60 includes a reference count 80 indicating how many blocks of virtual metadata are sharing the file system data block 60. Each of the blocks of virtual block metadata 65, 66, 67 also has a respective reference count 81, 82, 83 indicating how many files are sharing the block of virtual block metadata.

Each of the files 62, 63, 64 has respective file attributes 71, 72, 73 and file mapping metadata 74, 75, 76 including a respective block pointer 77, 78, 79 to the respective block of virtual block metadata 65, 66, 67. For example, block pointers are found in an inode and in an indirect block tree or in a B-tree index of each file.

For finding the file data at a specified offset in the logical extent of a specified file, the file mapping metadata is searched for a block pointer corresponding to the specified offset. For using the corresponding block pointer to find the file data at the specified offset, the block pointer is tested to determine whether the block pointer is pointing to either a block of virtual block metadata or a file system data block. For example, block pointers having values greater than a predetermined threshold are reserved for blocks of virtual block metadata. If the corresponding block pointer has a value greater than the predetermined threshold, then the block pointer is used to access the pointed-to block of virtual block metadata 65, 66, 67 to read a block pointer 84, 85, 86 and a sector bitmap 68, 69, 70 from the block of virtual block metadata. The block pointer read from the block of virtual block metadata is used as a base address to read the compressed file data from the particular sectors of the file system data block as indicated by the bits that are set in the sector bitmap.

The virtual block metadata 65, 66 representing a compressed data block can also be shared among files. For example, when the data de-duplication facility finds that a new file 87 has a data block containing the same data as the compressed data block for the first file 62, then the data de-duplication sets a block pointer 88 in the file mapping metadata 89 of the new file 87 to point to the virtual block metadata 65, and increments the reference count 81 of the virtual block metadata by one.

Figure 3:
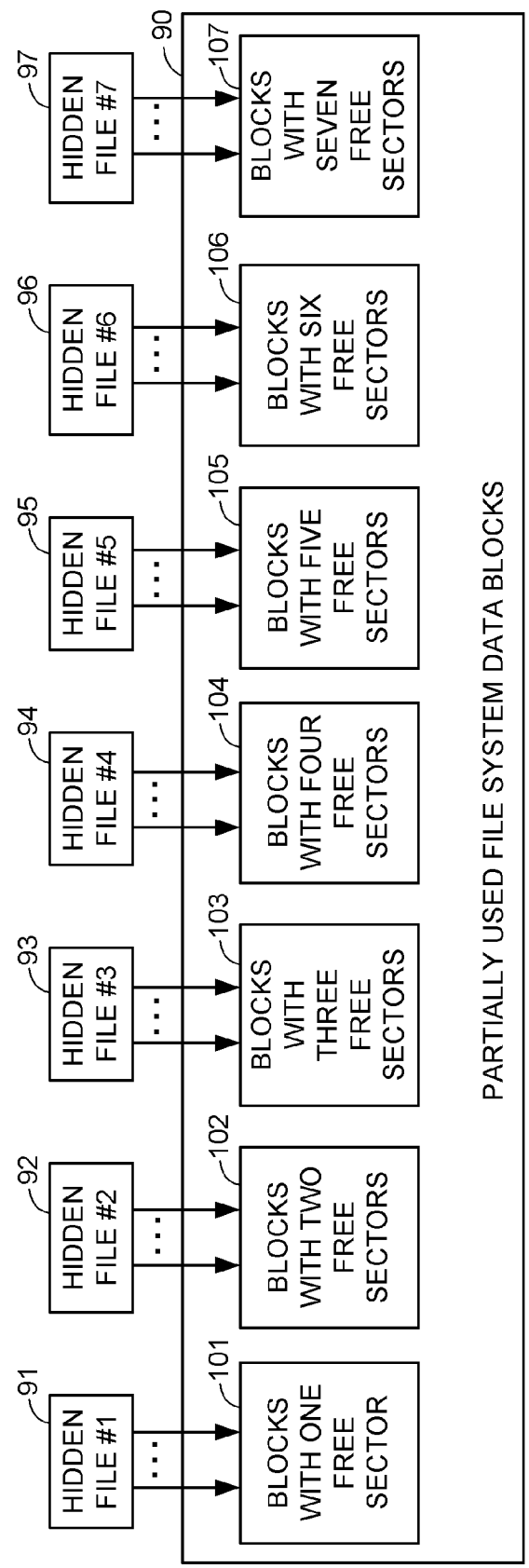
FIG. 3 is a block diagram of a series of hidden files for indexing partially used file system data blocks having particular numbers of free sectors.

In order to allocate different sectors of a file system data block to different files, there also is provided a way of identifying partially used file system data blocks having a desired number of free sectors. As shown in FIG. 3, the file system includes a series of seven hidden files 91, 92, 93, 94, 95, 96, and 97, and each of these seven hidden files includes the partially used file system data blocks 90 having a respective number of free sectors 101, 102, 103, 104, 105, 106, 107. For example, the first hidden file 91 includes all of the partially used file system data blocks 101 having only one free sector, and the seventh hidden file 97 includes all of the partially used file system data blocks 107 having only seven free sectors.

If a file data block is compressed and the compressed data consists of "N" sectors, then the "Nth" hidden file is accessed to find a pointer to a file system data block having "N" sectors. If this "Nth" hidden file has such a file system data block, then this file system data block is unlinked from the hidden file and linked to the file being compressed. If this hidden file happens to be empty, then the "(N+1)th" file is accessed to find a pointer to a file system data block having "N+1" sectors, and so on, until a suitable file system data block is found, or until the seventh hidden file 97 is searched and found to be empty.

If a suitable file system data block is found, then it is unlinked from the hidden file and linked to the file being compressed and filled with the compressed data with the compressed data block, but it may also have at least one free sector left over. In this case, this partially filled file system data block is then linked to another one of the hidden files depending on the number of free sectors left over. If a suitable partially used file system data block is not found, then a free data block is allocated, and when this free data block becomes partially used after being partially filled with compressed data, it is linked to a particular one of the hidden files 91 to 97 depending on the number of free sectors that are left over.

If a sector is released from a partially filled file system data block as a result of file deletion, truncation, or block deallocation in a "punch hole" operation, then the file system data block is removed from its hidden file and moved to another hidden file or deallocated, depending on whether all of the sectors have become fee.

Figure 4:
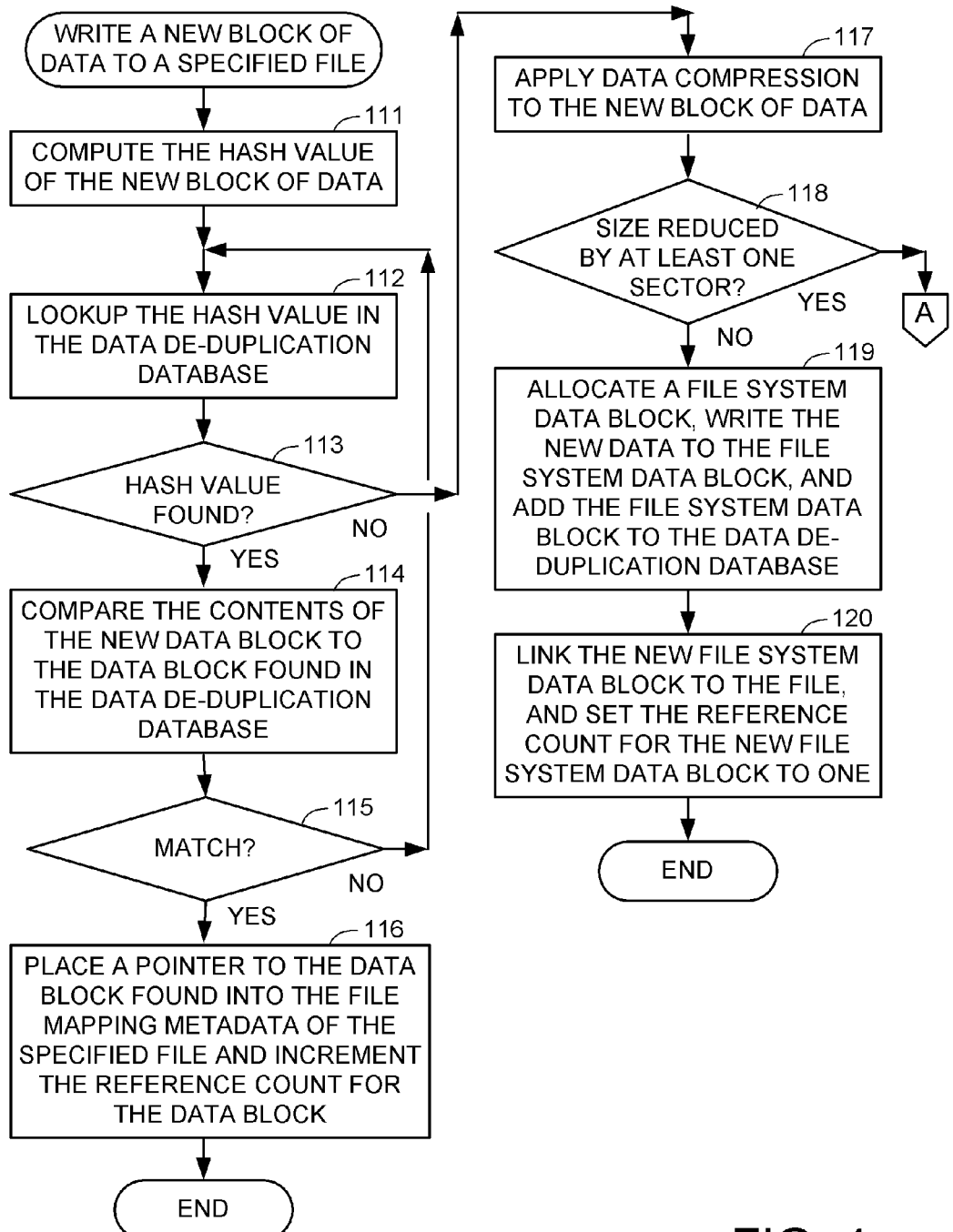
FIGS. 4, 5, and 6 together comprise a flowchart of a procedure for sharing file system data blocks among files in the file server of FIG. 1.
Figure 5:
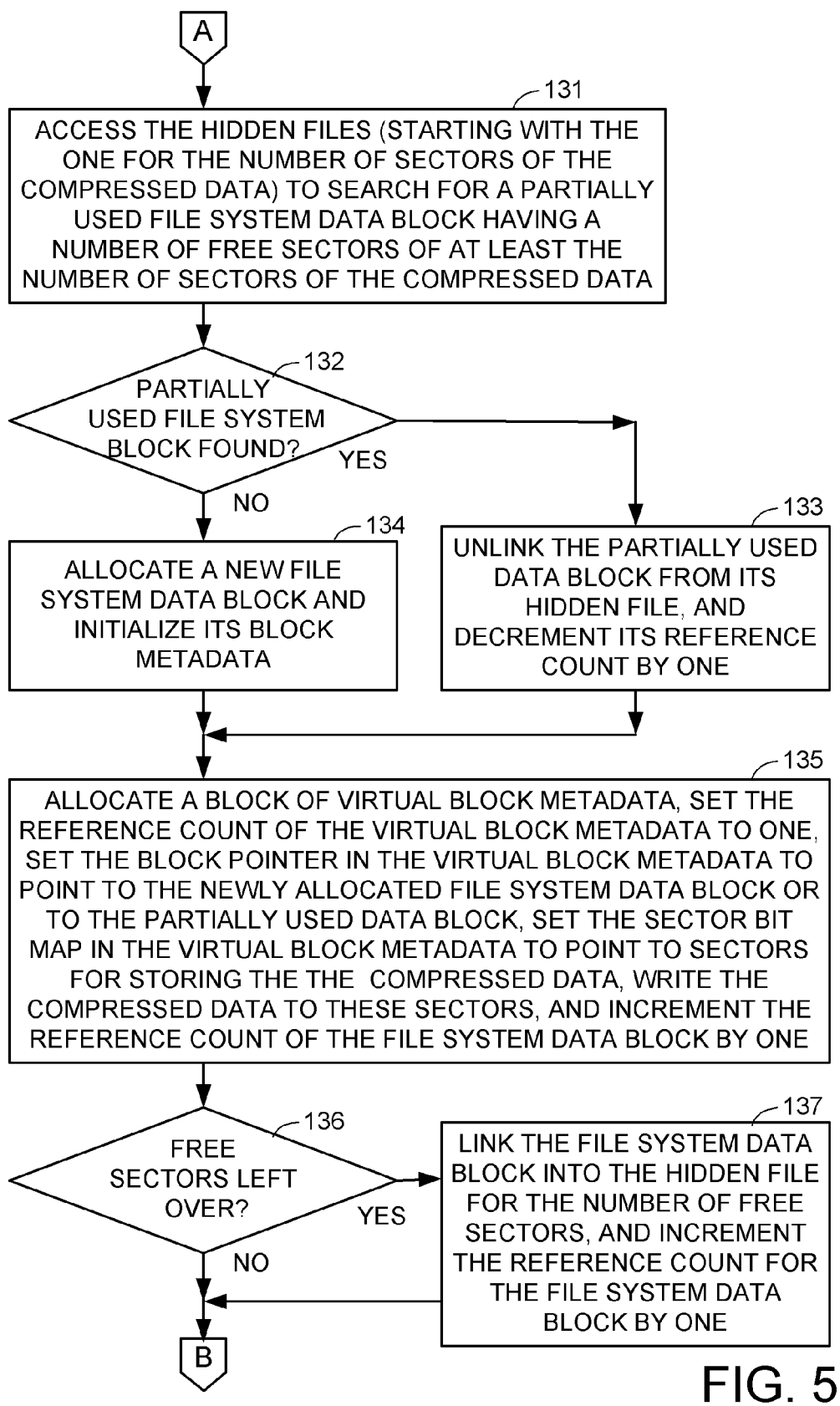
Figure 6:
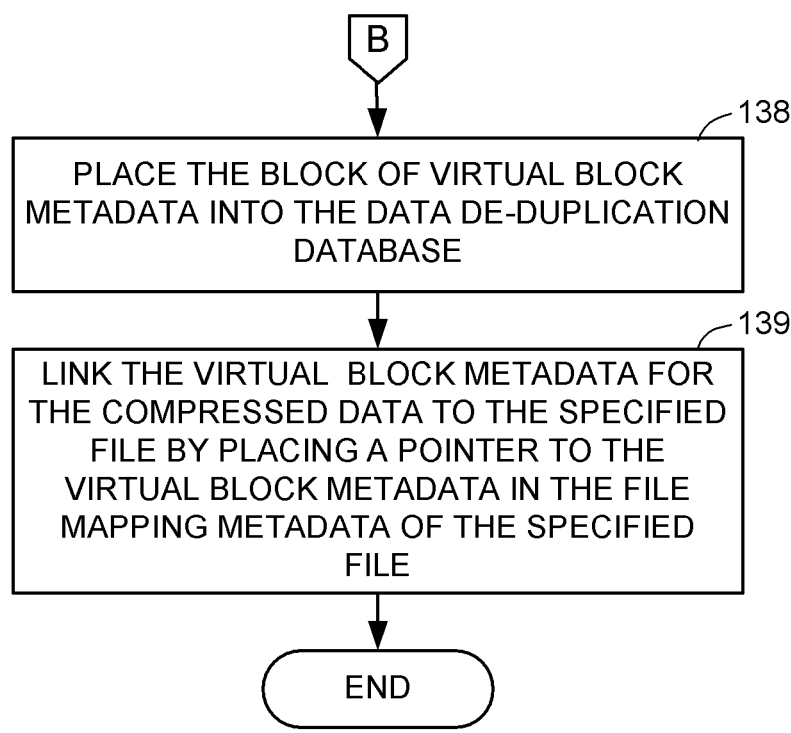

FIGS. 4, 5 and 6 together show a specific procedure for block sharing when a new block of data is written to a specified file in the file server of FIG. 1. In a first step 111 in FIG. 4, the data de-duplication facility computes the hash value of the new block of data. In step 112, the data de-duplication facility looks up the hash value in the data de-duplication database. In step 113, if the hash value is found, then execution continues to step 114. In step 114, the data de-duplication facility compares the contents of the new data block to the data block found in the data de-duplication database. In step 115, if there is not a match, then execution loops back to step 112 to continue the search of the data de-duplication database. Otherwise, in step 115, if there is a match, then execution continues to step 116 to place a pointer to the data block found into the file, and to increment the reference count of the matching block in the data de-duplication database. This reference count is in the virtual block metadata of the matching block if the matching block is represented by virtual block metadata (i.e., if the matching block is actually a certain number of sectors of compressed data in a file system data block) or the reference count is in the block metadata of a file system data block if the matching block is a file system data block. After step 116, the write operation is finished.

In step 113, if the hash value is not found in the data de-duplication database, then execution branches from step 113 to step 117. In step 117, a data compression procedure is applied to the new block of data. For example, the data compression procedure is a general-purpose loss-less compression technique such as the Lempel-Ziv procedure described above. In step 118, if the size of the compressed data block is not at least one sector smaller than the size of the file system data block, then execution continues to step 119. In step 119, the new block of data in its original uncompressed form is added to the data de-duplication database, and a reference count in the associated block metadata is set to one. In step 120, the new block of data is linked to the specified file, and the write operation is finished.

In step 118, if the size of the compressed data block is at least one sector smaller than the size of the file system data block, then execution branches to step 131 of FIG. 5 to access the hidden files, starting with the one for the number of sectors of the compressed data, to search for a partially used file system data block having a number of free sectors of at least the number of sectors of the compressed data block. In step 132, if such a partially used file system data block is found, then execution branches to step 133 to unlink the partially used data block from its hidden file, and to decrement its reference count by one. Otherwise, in step 132, if such a partially used file system data block is not found, then execution continues to step 134 to allocate a new file system data block and to initialize its block metadata. After step 133 or step 134, execution continues to step 135.

In step 135, a block of virtual block metadata is allocated to represent the new compressed data block, the reference count in this virtual block metadata is set to one, the block pointer in this virtual block metadata is set to point to the partially used or newly allocated file system data block, the sector bitmap in this virtual block metadata is set to allocate the required number of sectors to store the new compressed data, the new compressed data is written to the allocated sectors of the file system data block, and the reference count for the file system data block is incremented by one.

In step 136, if the file system data block has free sectors left over, then execution branches to step 137 to link the file system data block into the hidden file for the particular number of unused sectors, and the reference count for the file system data block is incremented by one. The file system data block is linked into the hidden file for the particular number of unused sectors through a block of virtual block metadata, which would already be allocated if the file system data block were unlinked from a hidden file in step 133, or which would be newly allocated if the file system data block were allocated in step 134.

Execution continues from step 137 to step 138 of FIG. 6. Execution also continues from step 136 to step 138 if there are not any free sectors left over in the file system data block. In step 138, the virtual block metadata for the new compressed data block is added to the data de-duplication database. Finally, in step 139, the virtual block metadata representing the new compressed data block is linked to the specified file, and the write operation is finished.

The system as described above could be modified in various ways without changing the basic principles of operation. For example, FIG. 2 shows that a sector bitmap is used for identifying portions of a file system data block that store the compressed data for a particular compressed data block, or that identify unused portions of a file system data block. Each bitmap could be replaced with an extent map identifying the used or unused portion of the file system data block by one or more ranges of byte addresses within the data block.

FIG. 2 also shows reference counts for indicating the sharing of the file system data blocks among virtual blocks and the sharing of the virtual blocks among files. When data blocks are shared for data de-duplication and these data blocks are also shared among snapshot versions, the reference counts can be delegated reference counts as described in Armangau et al. U.S. Pat. No. 8,032,498 issued Oct. 4, 2011, incorporated herein by reference.

In view of the above, a file server has a data compression facility and also a snapshot copy facility or a data de-duplication facility that shares data blocks among files. Compression of the file data on a file system block basis leads to a problem of partially used file system data blocks when the file system data blocks are shared among files. This problem is solved by partial block allocation so that file system data blocks are shared among files that do not share identical data. Block pointers in the file mapping metadata point to virtual blocks representing the compressed data blocks, and associated virtual block metadata identifies portions of file system data blocks that store the compressed data. For example, a portion of a file system data block is identified by a sector bitmap, and the virtual block metadata also includes a reference count to indicate sharing of a compressed data block among files. A series of hidden files provides an efficient way of indexing partially used file system data blocks having particular numbers of free sectors. If a sector is released from a partially used file system data block as a result of file deletion, truncation, or block deallocation, then the file system data block is removed from its hidden file and moved to another hidden file or deallocated.

What is claimed is:

1. A method of operating a file server, the file server having data storage storing a file system, a data processor coupled to the data storage for access to files in the file system, and non-transitory computer readable storage medium coupled to the data processor and storing computer instructions, and the computer instructions, when executed by the data processor, perform a method of writing a new block of data to a first file in the file system by the steps of:
    (a) compressing the new block of data to produce compressed data for the first file;
    (b) finding a file system data block containing compressed data of a second file in the file system and having sufficient free space for storage of the compressed data for the first file;
    (c) writing the compressed data for the first file to the free space of the file system data block; and
    (d) linking the compressed data for the first file to the first file.

2. The method as claimed in claim 1, wherein step (d) includes allocating storage for virtual block metadata about the compressed data for the first file, setting a pointer to the file system data block in the virtual block metadata, and setting a pointer to the storage for the virtual block metadata in file mapping metadata of the first file.

3. The method as claimed in claim 2, which further includes setting in the virtual block metadata an indication of a portion of the file system data block that stores the compressed data for the first file.

4. The method as claimed in claim 3, wherein the setting of the indication of the portion of the file system data block that stores the compressed data for the first file is performed by setting bits in a sector bitmap in the virtual block metadata so that the sector bitmap indicates sectors of the file system data block that store the compressed data for the first file.

5. The method as claimed in claim 1, wherein the compressed data for the first file has a number of sectors, and step (b) includes searching for a file system data block that is partially filled with file data and has a number of free sectors of at least the number of sectors of the compressed data for the first file.

6. The method as claimed in claim 1, wherein step (b) includes searching hidden files to find the file system data block, wherein each of the hidden files contains file system data blocks that are partially filled with file data and have a certain number of free sectors.

7. A file server comprising:
    data storage storing a file system,
    a data processor coupled to the data storage for access to files in the file system, and
    non-transitory computer readable storage medium coupled to the data processor and storing computer instructions, wherein the computer instructions, when executed by the data processor, perform a method of writing a new block of data to a first file in the file system by the steps of:
    (a) compressing the new block of data to produce compressed data for the first file;
    (b) finding a file system data block containing compressed data of a second file in the file system and having sufficient free space for storage of the compressed data for the first file;
    (c) writing the compressed data for the first file to the free space of the file system data block; and
    (d) linking the compressed data for the first file to the first file.

8. The file server as claimed in claim 7, wherein step (d) includes allocating storage for virtual block metadata about the compressed data for the first file, setting a pointer to the file system data block in the virtual block metadata, and setting a pointer to the storage for the virtual block metadata in file mapping metadata of the first file.

9. The file server as claimed in claim 8, wherein the computer instructions, when executed by the data processor, further set in the virtual block metadata an indication of a portion of the file system data block that stores the compressed data for the first file.

10. The file server as claimed in claim 9, wherein the setting of the indication of the portion of the file system data block that stores the compressed data for the first file is performed by setting bits in a sector bitmap in the virtual block metadata so that the sector bitmap indicates sectors of the file system data block that store the compressed data for the first file.

11. The file server as claimed in claim 7, wherein the compressed data for the first file has a number of sectors, and step (b) includes searching for a file system data block that is partially filled with file data and has a number of free sectors of at least the number of sectors of the compressed data for the first file.

12. The file server as claimed in claim 7, wherein the computer instructions include a snapshot copy facility for sharing data blocks among snapshot copies, and a data de-duplication facility for sharing data blocks among files.

13. The file server as claimed in claim 7, wherein step (b) includes searching hidden files to find the file system data block, wherein each of the hidden files contains file system data blocks that are partially filled with file data and have a certain number of free sectors.

14. A computer program product comprising non-transitory computer readable storage medium containing computer instructions that, when executed by a data processor of a file server, perform a method of writing a new block of data to a first file in a file system by the steps of:
    (a) compressing the new block of data to produce compressed data for the first file;
    (b) finding a file system data block containing compressed data of a second file in the file system and having sufficient free space for storage of the compressed data for the first file;
    (c) writing the compressed data for the first file to the free space of the file system data block; and
    (d) linking the compressed data for the first file to the first file.

15. The computer program product as claimed in claim 14, wherein step (d) includes allocating storage for virtual block metadata about the compressed data for the first file, setting a pointer to the file system data block in the virtual block metadata, and setting a pointer to the storage for the virtual block metadata in file mapping metadata of the first file.

16. The computer program product as claimed in claim 15, wherein the computer instructions, when executed by the data processor, further set in the virtual block metadata an indication of a portion of the file system data block that stores the compressed data for the first file.

17. The computer program product as claimed in claim 16, wherein the setting of the indication of the portion of the file system data block that stores the compressed data for the first file is performed by setting bits in a sector bitmap in the virtual block metadata so that the sector bitmap indicates sectors of the file system data block that store the compressed data for the first file.

18. The computer program product as claimed in claim 14, wherein the compressed data for the first file has a number of sectors, and step (b) includes searching for a file system data block that is partially filled with file data and has a number of free sectors of at least the number of sectors of the compressed data for the first file.

19. The computer program product as claimed in claim 14, wherein the computer instructions include a snapshot copy facility for sharing data blocks among snapshot copies, and a data de-duplication facility for sharing data blocks among files.

20. The computer program product as claimed in claim 14, wherein step (b) includes searching hidden files to find the file system data block, wherein each of the hidden files contains file system data blocks that are partially filled with file data and have a certain number of free sectors.

21. A method of operating a file server, the file server having data storage storing a file system, a data processor coupled to the data storage for access to files in the file system, and non-transitory computer readable storage medium coupled to the data processor and storing computer instructions, and the computer instructions, when executed by the data processor, perform a method of writing a new block of data to a first file in the file system by the steps of:
  (a) compressing the new block of data to produce compressed data for the first file;
  (b) finding a file system data block containing compressed data of a second file in the file system and having sufficient free space for storage of the compressed data for the first file;
  (c) writing the compressed data for the first file to the free space of the file system data block; and
  (d) linking the compressed data for the first file to the first file;
  wherein step (d) includes allocating storage for virtual block metadata about the compressed data for the first file, setting a pointer to the file system data block in the virtual block metadata, and setting a pointer to the storage for the virtual block metadata in file mapping metadata of the first file, and
  which further includes setting in the virtual block metadata an indication of a portion of the file system data block that stores the compressed data for the first file, and
  wherein the setting of the indication of the portion of the file system data block that stores the compressed data for the first file is performed by setting bits in a sector bitmap in the virtual block metadata so that the sector bitmap indicates sectors of the file system data block that store the compressed data for the first file, and
  wherein the compressed data for the first file has a number of sectors, and step (b) includes searching for a file system data block that is partially filled with file data and has a number of free sectors of at least the number of sectors of the compressed data for the first file.

22. A method of operating a file server, the file server having data storage storing a file system, a data processor coupled to the data storage for access to files in the file system, and non-transitory computer readable storage medium coupled to the data processor and storing computer instructions, and the computer instructions, when executed by the data processor, perform a method of writing a new block of data to a first file in the file system by the steps of:
  (a) compressing the new block of data to produce compressed data for the first file;
  (b) finding a file system data block containing compressed data of a second file in the file system and having sufficient free space for storage of the compressed data for the first file;
  (c) writing the compressed data for the first file to the free space of the file system data block; and
  (d) linking the compressed data for the first file to the first file;
  wherein the compressed data for the first file has a number of sectors;
  step (b) includes searching for a file system data block that is partially filled with file data and has a number of free sectors of at least the number of sectors of the compressed data for the first file; and
  step (d) includes allocating storage for virtual block metadata about the compressed data for the first file, setting a pointer to the file system data block in the virtual block metadata, and setting bits in a sector bitmap in the virtual block metadata so that the sector bitmap indicates sectors of the file system data block that store the compressed data for the first file.

\* \* \* \* \*